United States Patent [19]
Oguchi et al.

[11] Patent Number: 5,813,212
[45] Date of Patent: Sep. 29, 1998

[54] NITROGEN OXIDE REMOVAL CONTROL APPARATUS

[75] Inventors: Haruo Oguchi; Shirou Hino, both of Yokohama; Toshie Kataoka, Kawasaki, all of Japan

[73] Assignees: Kabushiki Kaisha Toshiba; Toshiba Engineering Co., both of Kawasaki, Japan

[21] Appl. No.: 934,905

[22] Filed: Sep. 22, 1997

Related U.S. Application Data

[62] Division of Ser. No. 712,271, Sep. 11, 1996, which is a division of Ser. No. 362,403, Dec. 23, 1994, Pat. No. 5,584,172.

[30] Foreign Application Priority Data

Dec. 24, 1993 [JP] Japan ................................. 5-325552

[51] Int. Cl.[6] ........................................................ F02C 7/08
[52] U.S. Cl. ................................................................ 60/39.5
[58] Field of Search ................................ 60/39.5, 39.55, 60/39.58, 723, 39.24

[56] References Cited

U.S. PATENT DOCUMENTS

| 4,131,432 | 12/1978 | Sato et al. | 60/39.5 |
|---|---|---|---|
| 4,473,536 | 9/1984 | Carberg et al. | 423/239 |
| 4,473,537 | 9/1984 | Ford, Jr. et al. | 423/239 |
| 5,282,355 | 2/1994 | Yamaguchi | 60/39.5 |

FOREIGN PATENT DOCUMENTS

| 13015 | 2/1978 | Japan | 60/39.5 |
|---|---|---|---|
| 9911 | 7/1978 | Japan | 60/39.281 |
| 197726 | 9/1986 | Japan | 60/39.281 |
| 3036409 | 2/1991 | Japan | 60/39.5 |
| 3-42930 | 6/1991 | Japan . | |

*Primary Examiner*—Charles G. Freay
*Attorney, Agent, or Firm*—Finnegan, Henderson, Farabow, Garrett & Dunner, L.L.P.

[57] ABSTRACT

A power generation plant possessing a gas turbine includes a nitrogen oxide removal apparatus for injecting a reducing material such as ammonia into exhaust gas from the gas turbine to reduce NOx emission under a predetermined level. To a feedback control system for estimating such an amount of the reducing material to be injected that a measured NOx amount at an outlet of the nitrogen oxide removal apparatus will get toward a NOx setpoint there is added a feedback control system for estimating an injection amount of the reducing material required for a NOx flow rate at an inlet of the nitrogen oxide removal apparatus based upon a mole ratio of the reducing material to the NOx. The measured NOx at the inlet of the nitrogen oxide removal apparatus is corrected based upon the combustion conditions of the gas turbine unit. NOx setpoint and the mole ratio are estimated based upon the operating conditions of a plant related to nitrogen oxide removal efficiency. Even in the plant state where variations of NOx production are severe, NOx and the reducing material exhausted into the atmosphere are maintained at an acceptable level.

6 Claims, 11 Drawing Sheets

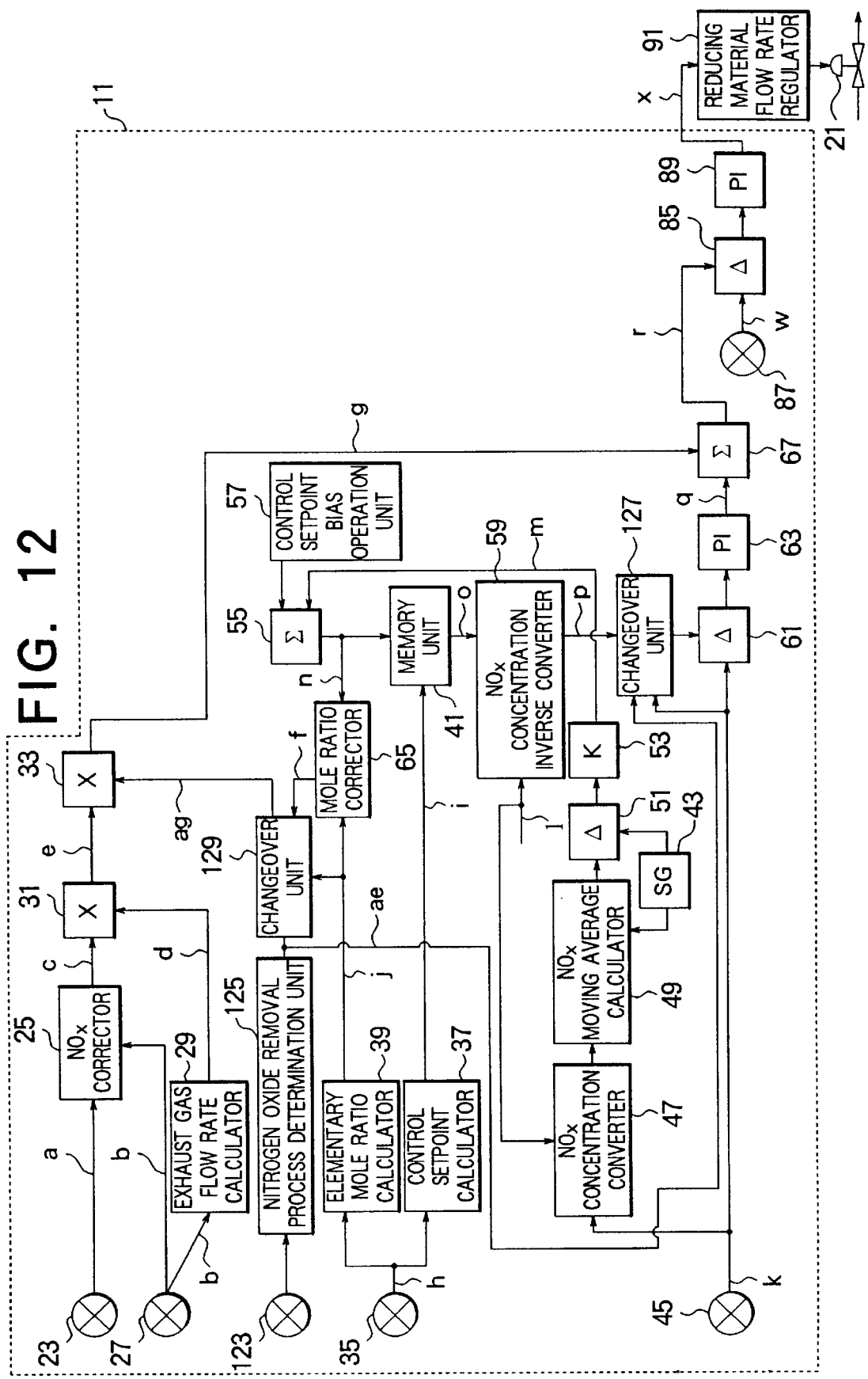

NITROGEN OXIDE REMOVAL CONTROL APPARATUS

This is a division of application Ser. No. 08/712,271, filed Sep. 11, 1996, which is a division of Ser. No. 08/1362,403, filed Dec. 23, 1994, now U.S. Pat. No. 5,584,172.

BACKGROUND OF THE INVENTION

1. Field of the Invention

The present invention relates to a nitrogen oxide removal control apparatus for reducing nitrogen oxides involved in exhaust gas by controlling injection of a reducing material such as ammonia into the exhaust gas from a gas turbine of a power generation plant.

2. Description of the Prior Art

Power generation plants using a gas turbine include a simple cycle power generation plant where a generator is driven by at least one gas turbine for power generation, and a combined cycle power generation plant where a plurality of gas turbines and at least one steam turbine are provided, the steam turbine being driven by steam produced by making use of heat of exhaust gas from the gas turbines, and electric power is generated by these turbines.

The combined cycle power generation plant of the so-called waste heat recovery system is divided roughly into a single shaft type and a multiple shaft type. In the single shaft type, a gas turbine, a steam turbine, and a generator are coupled with a common shaft, and in the multiple shaft type a gas turbine and a steam turbine have separate individual shafts to each of which generators are coupled.

In such power generation plants, a fuel from a fuel system is supplied to a combustor together with air from a compressor and is combusted, and produced combustion gas is supplied to a gas turbine. The gas turbine is driven with the combustion gas, whereby a generator coupled on the same shaft is rotated to provide an electric power.

Waste gas exhausted from a gas turbine generally involves nitrogen oxides called NOx as a general term such as NO and $NO_2$, etc., harmful to human bodies. The NOx promotes pollution of environment as it is discharged to the air, so that it should be removed before it is exhausted to the atmosphere.

For this, the best efforts are paid by providing a nitrogen oxide removal apparatus, which is capable of reducing NOx concentration by introducing a reducing material into a flue for guiding exhaust gas.

The nitrogen oxide removal apparatus is to reduce and decompose nitrogen oxides to harmless nitrogen gas and water vapor by introducing a reducing material such as ammonia into exhaust gas and thereafter forcing the exhaust gas to pass through a catalyst on the downstream side. In the nitrogen oxide removal process, non-reacted NOx is exhausted intactly into the atmosphere. When ammonia is used as the reducing material, for example, the non-reacted NOx is increased with too little supply of the ammonia, while the non-reacted ammonia is exhausted with too much supply of the same. The process suffers from responsibility of the control, which is not necessarily satisfactory, because of its being a chemical reaction of NOx and ammonia in the presence of a catalyst. In the nitrogen oxide removal apparatus, there are produced varieties of inconveniences if any reducing material of the amount matching to that of NOx involved in exhaust gas is not supplied at proper timing, so that there is required a nitrogen oxide removal control apparatus as one for controlling the supply amount and supply timing of the reducing material.

It is noted that standards of NOx exhausted from the plant are applied for flow rates or concentrations thereof, and for both of them. The nitrogen oxide removal control apparatus is therefore needed to control a control target such that the NOx flow rate, the NOx concentration or any severe one therebetween satisfies the standards. When the NOx concentration is regulated, for example, the nitrogen oxide removal control apparatus executes feedback control such that a measured NOx from a detector for measuring the NOx concentration at an outlet of the nitrogen oxide removal apparatus becomes equal to a NOx setpoint set to be less than a standard value.

Such feedback control has no problem provided the amount of NOx produced in a combustor is less varied. Only with the feedback control, however, the control target fails to be satisfactorily controlled upon the plant being started or stopped or upon a plant load being varied owing to a fact that the amount of produced NOx is violently varied with changing load, owing to a fact that the nitrogen oxide removal process is delayed, and owing to a fact that a measurement by a NOx detector at the outlet of the nitrogen oxide removal apparatus is delayed. To solve this difficulty, prior art discloses techniques for compensating the change in the NOx production with the change in the load by incorporating feedforward control additionally to the feedback control.

For example, U.S. Pat. No. 4,473,536 and U.S. Pat. No. 4,473,537 disclose a control system wherein a mole ratio of ammonia/NOx is estimated by proportional integration (PI) control based upon a deviation of a setpoint and a measured value of NOx, which ratio is in turn multiplied by a predicted amount of NOx at an inlet of the nitrogen oxide removal apparatus estimated from the operating conditions of a gas turbine to yield an ammonia flow rate to be injected. In the control system, the mole ratio of ammonia/NOx is multiplied by the predicted amount of NOx, so that a loop gain is lowered as the predicted amount of NOx is reduced. Since the predicted amount of NOx may involve error caused by computation accuracy, a control signal perhaps involves error correspondingly.

Increasing concern is recently concentrated on natural environment destruction, and varieties of regulations of NOx are provided and become progressively severe. Additionally, the nonreacted reducing material such as, for example, ammonia has been subjected to varieties of regulations.

For this, there have been developed the so-called low NOx combustors which produce less NOx compared with conventional combustors. Such low NOx combustors are classified according to combustion techniques typically into a multistage combustor and a catalyst combustor, between which combustors with the multistage combustion technique are particularly promising.

Such multistage combustion technique is to restrict production of NOx by supplying a fuel successively dividing the fuel longitudinally of a combustor to lower flame temperature. In the multistage combustion technique, however, produced NOx concentration upon starting has a peak every time the fuel is changed over, the peak tending to be higher than that in a conventional combustor. The NOx production of the multistage combustor is regulated to be lower than that of the conventional combustor in the vicinity of a rated load, but in order to reduce the amount of NOx from the multistage combustor lower than the standards there is also required a nitrogen oxide removal apparatus.

In the case where a produced NOx amount is varied rapidly with a greater extent as in a power generation plant possessing a gas turbine unit of the multistage combustion technique, the prior art fails to control a NOx amount at an outlet of the nitrogen oxide removal apparatus to a predetermined value following up to change in a plant state with high accuracy. The bad controllability requires injection of an excessive reducing material, resulting in poor economy and a factor of environment destruction.

SUMMARY OF THE INVENTION

It is an object of the present invention to provide a nitrogen oxide removal control apparatus for reducing NOx by injecting a reducing material into an exhaust gas flow from a gas turbine, which overcomes the drawbacks of the prior art.

It is another object of the present invention to provide a nitrogen oxide removal control apparatus capable of properly controlling injection of a reducing material into an exhaust gas flow from a gas turbine corresponding to a state change in a power generation plant upon starting and stopping of the power generation plant and upon variations of a load.

It is still another object of the present invention to provide a nitrogen oxide removal control apparatus capable of keeping at acceptable levels of NOx and a reducing material emitted from a power generation plant possessing a gas turbine unit of a multistage combustion technique.

It is a further object of the present invention to provide a nitrogen oxide removal control apparatus wherein a mole ratio evaluated on the basis of the operating conditions of a plant and the amount of NOx at an inlet of a nitrogen oxide removal control apparatus corrected on the basis of combustion conditions of a gas turbine unit are used as feedforward control elements, and a NOx setpoint estimated on the basis of the operating conditions of the plant and a measured NOx amount at an outlet of the nitrogen oxide removal apparatus are used as feedback control elements, and injection of a reducing material corresponding to the state change of the plant is ensured.

More specifically, the present invention provides a nitrogen oxide removal control apparatus for controlling injection of a reducing material in a nitrogen oxide removal means, the apparatus comprising means for measuring a NOx amount at an outlet of the nitrogen oxide removal means to generate an outlet measured NOx signal, means for calculating an injection flow rate of the reducing material based on a deviation of the outlet measured NOx signal and a NOx setpoint to approximate the deviation to zero and for generating a feedback control reducing material injection flow rate signal, means for measuring a NOx amount at an inlet of the nitrogen oxide removal means to generate an inlet measured NOx signal, means for correcting the measured NOx amount at the inlet of the nitrogen oxide removal means based on combustion conditions of the gas turbine unit to generate an inlet corrected NOx signal, and means for compensating the feedback control reducing material injection flow rate signal based on the inlet corrected NOx signal and operating conditions of a plant having the gas turbine unit, the operating conditions of the plant being related to a state of the gas turbine exhaust.

In accordance with the present invention, it is also capable of dealing with NOx control of exhaust gas from a gas turbine unit using a multistage combustor, and is capable of satisfactorily following up rapid changes in a process state, for example, upon starting and stopping of the plant and upon changing load to introduce a proper reducing material for improvement of economicity and safety.

The above and other objects, features and advantages of the present invention will become more apparent from the following description when taken in conjunction with the accompanying drawings in which preferred embodiments of the present invention are shown by way of illustrative examples. In the drawings, like reference numerals designate the same elements.

BRIEF DESCRIPTION OF THE DRAWINGS

FIG. 12 is a block diagram illustrating a further another embodiment of the nitrogen oxide removal control apparatus of the present invention of FIG. 1.

DESCRIPTION OF THE PREFERRED EMBODIMENTS

Figure 1:
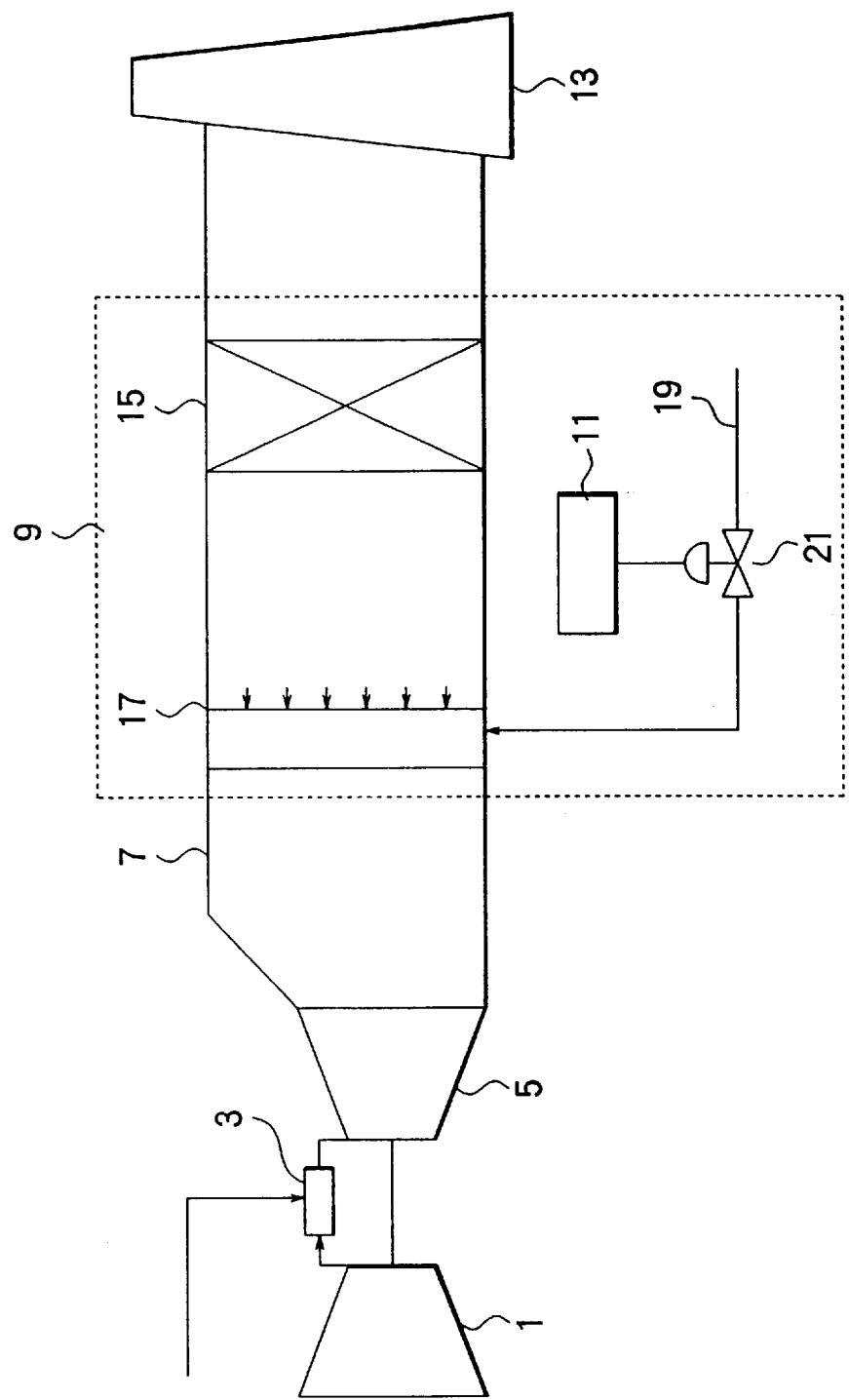
FIG. 1 is schematic diagram of a gas turbine power generation plant in which the invention is used.

Reffering to FIG. 1, a gas turbine power generation plant is illustrated, which comprises a compressor 1, a combustor 3, a turbine 5, a flue 7, a nitrogen oxide removal apparatus 9, a nitrogen oxide removal control apparatus 11, and a smokestack 13.

Air compressed by the compressor 1 is supplied to the combustor 3. The combustor 3 is supplied with a fuel separately, which fuel is combusted with the compressed air. High temperature gas produced in the combustor 3 is fed to the turbine 5 where it works to drive a generator (not illustrated) coupled with the turbine 5. Exhaust gas from the gas turbine unit including the combustor 3 and the turbine 5 is introduced into the flue 7, and passes through the nitrogen oxide removal apparatus 9 disposed in the flue 7 and thereafter exhausted from the smokestack 13 into the atmosphere.

The nitrogen oxide removal apparatus 9 comprises a catalyst 15 disposed in the flue 7, an injection grid 17 disposed on the upstream side of the catalyst 15, a reducing material supply pipe 19 connected with the injection grid 17, and a flow rate regulation valve 21 disposed on the reducing material supply pipe 19. A reducing material such as, for example, ammonia is injected from the injection grid 17 at a flow rate according to the degree of opening of the flow rate regulation valve 21 into an exhaust gas flow in the flue 7, and is mixed with the latter, whereby NOx in the exhaust gas reacts with the reducing material in the catalyst 15 and is reduced to nitrogen.

The nitrogen oxide removal control apparatus 11 adjusts the degree of opening of the flow rate regulation valve 21 to regulate the amount of the injection of the reducing material into the exhaust gas flow from the gas turbine unit, whereby the flow rates or concentrations of the NOx and the reducing material exhausted from the plant are controlled to allowable levels.

Figure 2:
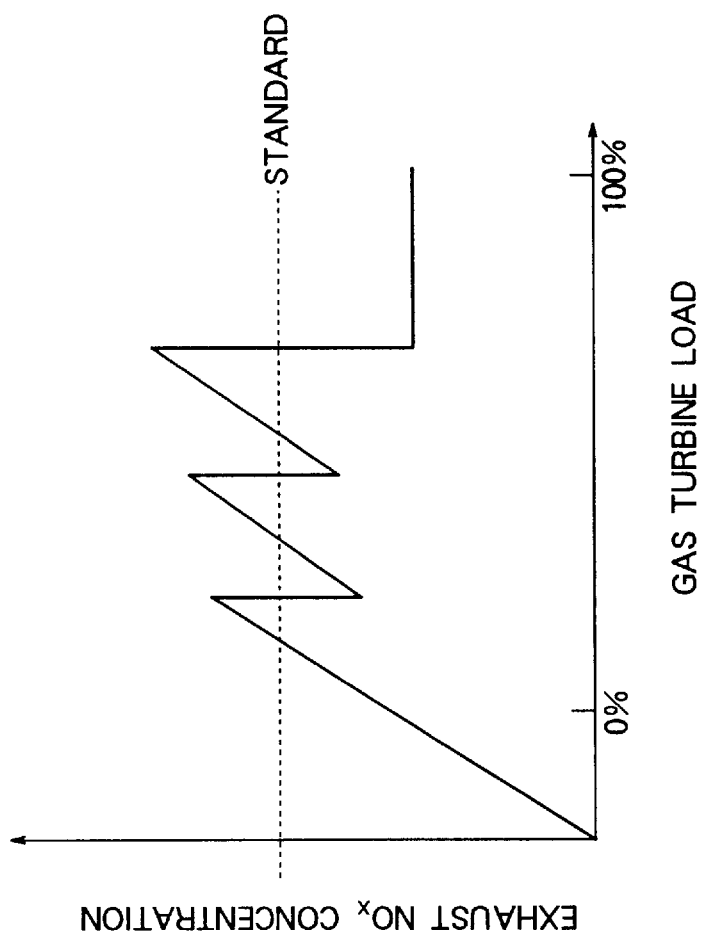
FIG. 2 is a graphic diagram exemplarily illustrating the variations of exhausted NOx from a multistage combustor.

Referring to FIG. 2, characteristics of NOx emission from the gas turbine unit using a multistage combustor are exemplarily illustrated. The multistage combustor is to supply a fuel by successively dividing it longitudinally, and suppress the production of NOx by lowering flame temperature. As illustrated in this figure, concentration characteristics of NOx in the gas turbine exhaust upon starting have a peak every time the fuel is successively divided, and is violently varied upward and downward.

Figure 3:
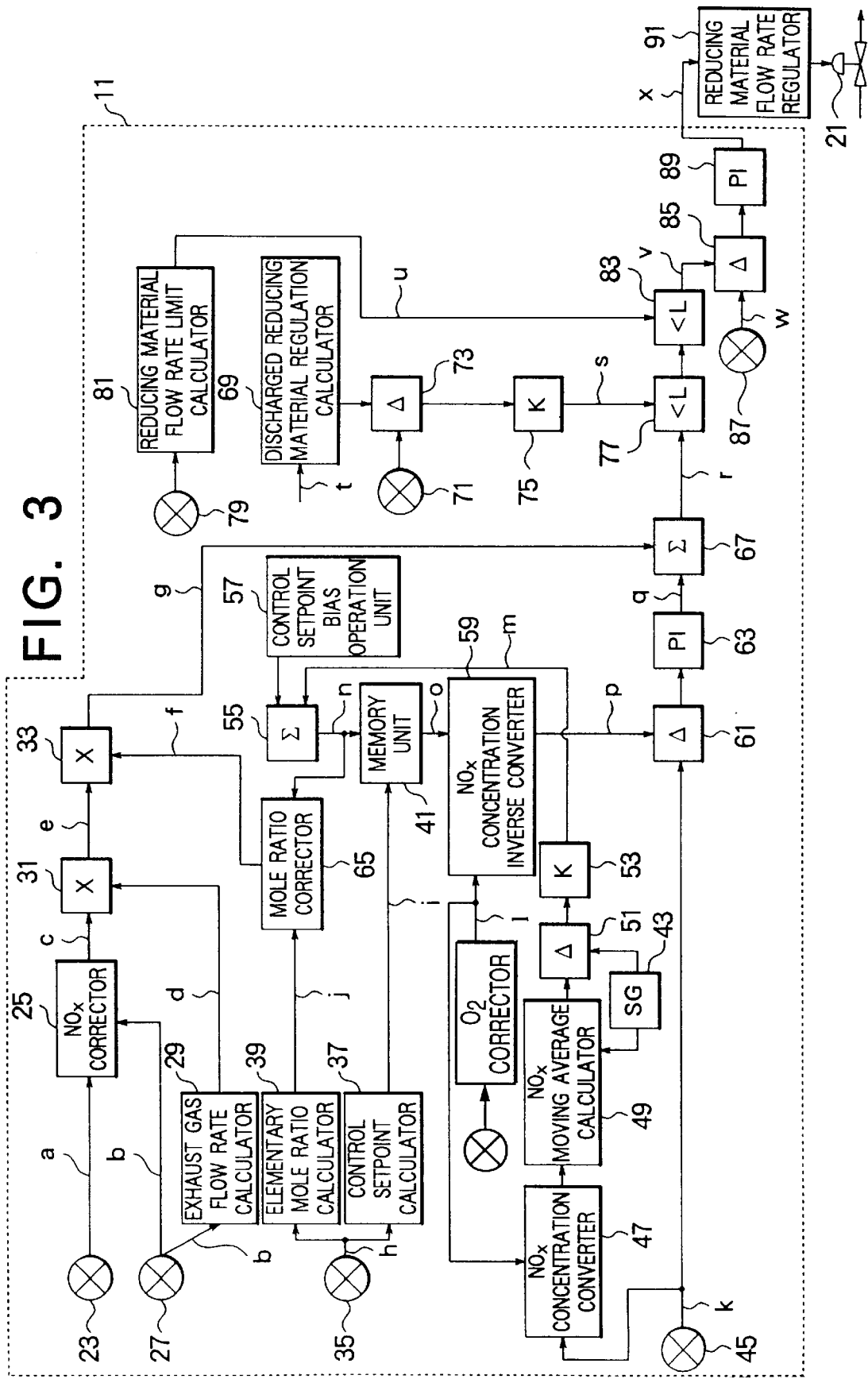
FIG. 3 is a block diagram illustrating an embodiment of a nitrogen oxide removal control apparatus according to the present invention of FIG. 1.

Referring to FIG. 3, an embodiment of the nitrogen oxide removal control apparatus 11 of the present invention is illustrated which will be described in the following. The nitrogen oxide removal control apparatus 11 is classified roughly into a feedback control system and a feedforward control system. The feedback control system includes a primary feedback control system for estimating a reducing material flow rate to adjust NOx concentration measured at an outlet of the nitrogen oxide removal apparatus toward set NOx concentration, and a secondary feedback control system for controlling the degree of opening of the reducing material flow rate regulation valve 21 such that the measured flow rate becomes equal to a finally estimated reducing material flow rate.

Only the feedback control system fails to ensure sufficient control performance owing to delayed measurement of the NOx concentration at the outlet of the nitrogen oxide removal apparatus and to dynamical characteristics (delayed reaction) of the nitrogen oxide removal process, so that the feedforward control system for precedently performing reducing material flow rate control using the NOx concentration at the inlet of the nitrogen oxide removal apparatus is added to the primary feedback control system.

In the feedforward control system, a NOx sensor 23 detects NOx concentration in exhaust gas at the inlet of the nitrogen oxide removal apparatus. A NOx corrector 25 corrects a displacement of a measured NOx signal (a) from the NOx sensor 23 from a true value due to delayed measurement using the state amount (a signal b) of the gas turbine unit indicative of combustion conditions, for example, an air flow rate from the compressor 1 and a fuel flow rate to the combustor 3 detected by a gas turbine state amount detector 27, and outputs a signal (c) representing accurate NOx concentration at the inlet of the nitrogen oxide removal apparatus.

Figure 4:
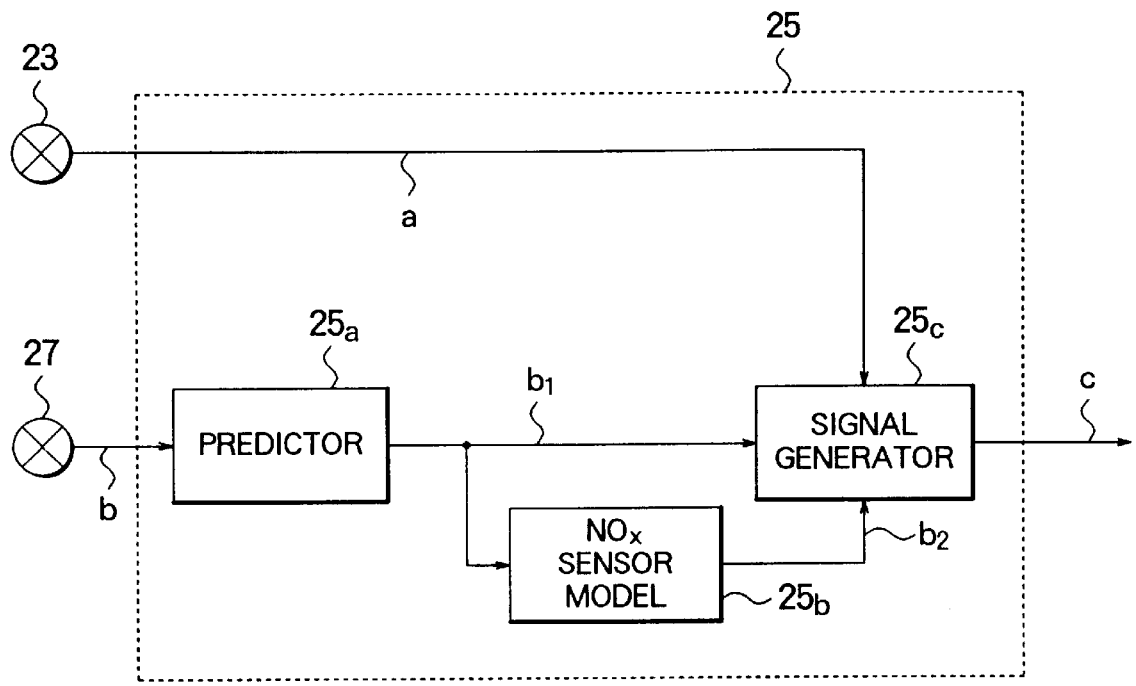
FIG. 4 is a block diagram exemplarily illustrating a NOx correction calculation unit in the nitrogen oxide removal control apparatus of FIG. 3.

The NOx corrector 25 comprises, for example, as illustrated in FIG. 4, a predictor 25a for predicting the NOx concentration at the inlet of the nitrogen oxide removal apparatus based upon the state amount signal (b) of the gas turbine unit, a NOx sensor model 25b inputting the predicted NOx concentration (a signal b1) and representing dynamic characteristics such as the delayed measurement of the NOx sensor 23 and waste time, and a signal generator 25c for generating a corrected NOx concentration signal (c) by adding a difference between an output b2 of the NOx sensor model 25b and an output b1 of the predictor 25a to the output (a) of the NOx sensor 23. The signal generator 25c may generate the corrected NOx concentration signal (c) by adding a difference between the output b2 of the NOx sensor model 25b and the output (a) of the NOx sensor 23 to the output b1 of the predictor 25a.

Figure 5:
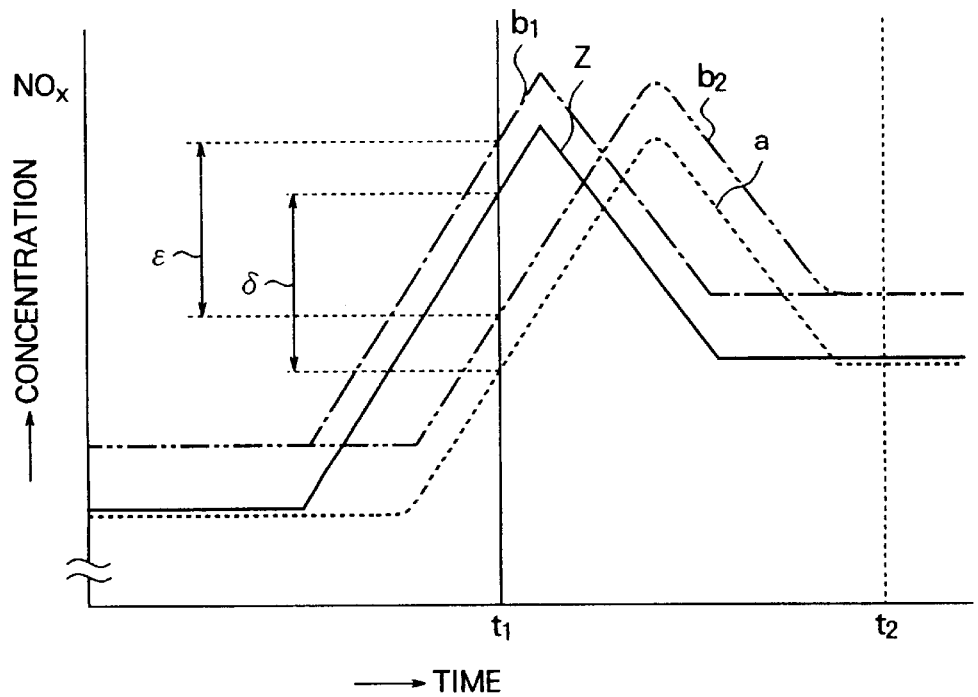
FIG. 5 is a graphic diagram exemplarily illustrating measured values, predicted values and true values of NOx concentration at an inlet of a nitrogen oxide removal apparatus, and output values of a NOx sensor model.

Referring to FIG. 5, operation of the NOx corrector 25 will be described. In FIG. 5, there are illustrated temporal changes in the predicted NOx concentration b1, the output b2 of the NOx sensor model 25b, and the output (a) of the NOx sensor 23 with respect to the temporal change in the true NOx concentration (z) at the inlet of the nitrogen oxide removal apparatus. The predicted NOx concentration b1 can be calculated based upon the gas turbine state amount signal (b) with, for example, a method disclosed in U.S. Pat. No. 4,473,536 and U.S. Pat. No. 4,473,537. The predicted value b1 produces an error or a difference from the true value (z) depending on calculation accuracy, which error substantially remains unchanged with respect to a load change. In contrast, the output (a) of the NOx sensor 23 has a remarkable time delay with respect to the true value (z) to produce a displacement or a difference from the true value (z) when the NOx concentration is varied. Accordingly, provided a difference $\delta$ is determined between the true value (z) and the output (a) of the NOx sensor 23 at a certain time t1 when the NOx concentration is varied, a true NOx concentration at the inlet of the nitrogen oxide removal apparatus can be yielded by adding the difference $\delta$ to the output (a) of the NOx sensor 23. For this, the NOx sensor model 25b which simulates the NOx sensor 23 is introduced. The NOx sensor model 25b is to represent dynamic characteristics such as delayed measurement and waste time of the NOx sensor 23, and is expressed by a transfer function including Laplace's operators, linear differential equations or nonlinear equations having upper and lower limits as a nonlinear factor. When the NOx sensor model 25b inputs the predicted NOx concentration b1, there is caused by the delayed measurement and the waste time a difference $\epsilon$ between the predicted NOx concentration b1 and the output b2 of the NOx sensor model 25b. The error of the predicted NOx concentration b1 with respect to the true NOx concentration (z) at the inlet of the nitrogen oxide removal apparatus remains substantially unchanged at all times, so that the difference $\epsilon$ becomes substantially equal to the difference $\delta$ between the true value (z) and the output (a) of the NOx sensor 23. Accordingly, more accurate value sharply approximating the true value (z) of the NOx concentration at the inlet of the nitrogen oxide removal apparatus is ensured by estimating the difference $\epsilon$ between the predicted NOx concentration b1 and the ouput b2 of the NOx sensor model 25b and adding the resulting difference $\epsilon$ to the output (a) of the NOx sensor 23.

The NOx corrector 25 may employ, besides the above situation, a method of estimating a bias based upon the gas turbine state amount signal (b) and adding a resulting bias to a measured value of the NOx sensor 23 or a method of estimating a correction coefficient based upon the state amount signal (b) of the gas turbine and multiplying a resulting correction coefficient to a measured value of the NOx sensor 23.

Returning to FIG. 3, an exhaust gas flow rate calculator 29 estimates a gas turbine exhaust gas flow rate signal (d) based upon the gas turbine state amount signal (b) from the gas turbine state amount detector 27, and outputs the signal (d)

to a multiplier 31. The multiplier 31 multiplies the inlet NOx concentration signal (c) corrected by the NOx corrector 25 by the exhaust gas flow rate signal (d) to generate a signal (e) representing a NOx flow rate at the inlet of the nitrogen oxide removal apparatus. The inlet NOx flow rate signal (e) is multiplied in a multiplier 33 by an optimum mole ratio signal (f) of a reducing material to the NOx, which signal (f) is estimated according to the plant conditions, whereby a flow rate of the reducing material required for the inlet NOx concentration, i.e., a feedforward (FF) reducing material injection flow rate signal (g) is generated.

The mole ratio for use in the feedforward control system and the NOx concentration setpoint for use in the primary feedback control system are estimated on the basis of the plant state amount detected by a calculation input detector 35. The calculation input detector 35 detects a process amount peculiar to the simple cycle power generation plant or a process amount peculiar to the combined cycle power generation plant which represents the state of the exhaust gas at the inlet of the nitrogen oxide removal apparatus including at least a plant load, atmospheric temperature, and atmospheric humidity, and outputs them to a control setpoint calculator 37 and an elementary mole ratio calculator 39 as a calculation signal (h) corresponding to the plant operating conditions.

The control setpoint calculator 37 estimates using the calculation signal (h) a control setpoint corresponding to the plant conditions, and outputs a resulting setpoint signal (i) to a memory unit 41. The elementary mole ratio calculator 39 estimates an elementary mole ratio signal (j) using the calculation signal (h).

The setpoint signal (i) and the elementary mole ratio signal (j) are estimated as follows.

Performance of the nitrogen oxide removal apparatus (represented by the so-called nitrogen oxide removal efficiency $\alpha$) is a function of the operating conditions of the plant, particularly the state of the exhaust gas at the inlet of the nitrogen oxide removal apparatus (represented by the calculation signal (h)), and a mole ratio.

$$\alpha = F(h, \text{mole ratio}) \tag{1}$$

The NOx concentration at the outlet of the nitrogen oxide removal apparatus is estimated from the nitrogen oxide removal efficiency $\alpha$, the NOx concentration at the inlet of the nitrogen oxide removal apparatus (represented by the calculation signal (h)), and the reaction delay (represented by the calculation signal (h)), and a function of the calculation signal (h) and the mole ratio.

$$\text{outlet NOx concentration} = (1 - \alpha) * \tag{2}$$
$$\text{inlet NOx concentration} * \text{reaction delay} - F(\alpha, h)$$

Equation (2) is as follows from equation (1).

$$\text{outlet NOx concentration} = F(h, \text{mole ratio}) \tag{3}$$

In contrast, since various standards (values and regions) for the calculation signal (h) (plant load, for example) are previously determined, the outlet NOx concentration and the mole ratio which satisfy those standards are determined, and the outlet NOx concentration and the mole ratio are taken as the setpoint signal (i) and the elementary mole ratio signal (j).

As described above, the outlet NOx concentration which satisfies various standards is estimated from the maximum nitrogen oxide removal efficiency which the nitrogen oxide removal apparatus ensures at a certain plant operating conditions, which concentration is in turn taken as the control setpoint to provide a setpoint which satisfies the standards and with which the nitrogen oxide removal apparatus is operable with its maximum nitrogen oxide removal efficiency. By taking a nitrogen oxide removal efficiency ensured at the plant condition into consideration, an excessive reducing material is prevented from being injected, and particularly control responsiveness upon starting and stopping and upon load variations is improved.

The NOx concentration setpoint for use in the primary feedback control system is determined by taking the control setpoint estimated by the control setpoint calculator 37 and standard to a moving average of the NOx concentration described below into consideration.

The NOx concentration standard of a moving average per hour previously set in a signal generator 43. An outlet measured NOx concentration (a signal (k)) from a NOx sensor 45 disposed at the outlet of the nitrogen oxide removal apparatus is converted by a NOx concentration converter 47 to NOx concentration corresponding to reference $O_2$ concentration (typically 16%) of the standard using a gas turbine exhaust $O_2$ concentration signal (l) upstream of the nitrogen oxide removal apparatus. This is performed in conformity with the following equation.

$$\text{converted NOx concentration (ppm)} = \tag{4}$$
$$\text{NOx concentration (ppm)} * \{(21(\%) - \text{reference } O_2 \text{ concentration}(\%)\}/$$
$$\{21\% - \text{exhaust } O_2 \text{ concentration}(\%)\}$$

In the equation, numeral 21 is $O_2$ concentration in the atmosphere.

It should be noted that instead of the gas turbine exhaust $O_2$ concentration signal (l) there may be used a value estimated from the gas turbine state amount signal (b) or a measured value by the $O_2$ sensor, provided there is used a corrected $O_2$ concentration estimated by the same method as the aforementioned inlet corrected NOx concentration signal (c), it represents more accurate gas turbine exhaust $O_2$ concentration for higher accurate control.

A NOx moving average calculator 49 inputs reduced NOx concentration from the NOx concentration converter 47, and further inputs (not shown) a signal representative of start timing of the gas turbine (e.g., signals of starting, firing, speed, load, and so on,) and a signal representative of stopping timing of the gas turbine (e.g., signals of stopping, extinguishment, speed, load, and so on.), estimates a moving average per hour of the NOx concentration in actual exhausted gas from the plant during the regulation period excepting a predetermined duration after the firing of the starting process and a predetermined duration before the extinguishment of the stopping process. The moving average per hour of the measured NOx concentration is compared in a subtractor 51 with the NOx concentration standard from the signal generator 43 and a difference therebetween is calculated. It is herein noted that, in the predetermined durations which are not the regulation period upon starting and stopping, a NOx moving average calculator 49 receives the NOx concentration standard from the signal generator 43 and outputs it to the subtractor 51, permitting the difference outputted from the subtractor 51 to be zero.

In a gain 53, the difference calculated by the subtractor 51 is multiplied by a gain to estimate a change in the control setpoint (the signal (i)) in response to the difference. More specifically, the gain 53 estimates the amount of a change to lower the control setpoint corresponding to the difference when the measurement values of the average are larger than the standard. In contrast, the gain 53 estimates a change to increase the control setpoint corresponding to the difference when the standard of the average is larger than the measurement value, and outputs an amount-of-change signal (m) to an adder 55.

A control setpoint bias operation unit 57 is operated to output a bias to the adder 55 when an operator wishes to increase or decrease a present NOx concentration setpoint with the bias. The adder 55 adds the bias to the amount-of-change signal (m) from the gain 53. The control setpoint signal (i) stored in the memory 41 is increased or decreased with a total amount-of-change signal (n) from the adder 55 to be changed to a final NOx concentration setpoint signal (o).

The regulation and control of NOx is typically performed with converted NOx concentration under condition of reference $O_2$ concentration, for example, 16% $O_2$, so that a NOx value estimated by the control setpoint calculator 37 and a NOx value set by an operator in the control setpoint bias operation unit 57 are converted NOx concentrations and hence the NOx concentration setpoint signal (o) is converted NOx concentration. In contrast, injection of a reducing material is performed for actual NOx concentration in actual exhaust gas, so that it is necessary to perform inverse conversion for the NOx concentration setpoint signal (o).

For this, the NOx concentration setpoint signal (o) is inversely converted to -an actual NOx concentration setpoint signal (p) by a NOx concentration inverse converter 59 using above-mentioned equation (4) on the basis of the gas turbine exhaust $O_2$ concentration (the signal (l)) upstream of the nitrogen oxide removal apparatus. The actual NOx concentration setpoint signal (p) is subtracted in a subtractor 61 by the outlet measured NOx concentration signal (k) from the NOx sensor 45. A PI controller 63 estimates a reducing material injection flow rate based on the deviation of the signal (p) and the signal (k) such that the measured NOx concentration at the outlet of the nitrogen oxide removal apparatus will move toward the actual NOx concentration setpoint and generates a FB reducing material injection flow rate signal (q). This is the output of the primary feedback control system.

An elementary mole ratio calculator 39 receives the calculation signal (h) and estimates a mole ratio to satisfy a control setpoint estimated by the control setpoint calculator 37. The mole ratio is related to the control setpoint as described previously, so that the mole ratio is needed to be changed with respect to a change in the control setpoint. A mole ratio corrector 65 corrects the elementary mole ratio signal (j) yielded in the elementary mole ratio calculator 39 based upon the total amount-of-change signal (n) from the adder 55, and outputs a resulting mole ratio signal (f). Hereby, a mole ratio signal (f) relative to the NOx concentration setpoint signal (o) can be estimated.

An adder 67 adds the output of the primary feedback control system, i.e., the FB reducing material flow rate signal (q) and the output of the feedforward control system, i.e., the FF reducing material flow rate signal (g) to generate a reducing material injection flow rate signal (r).

The reducing material injection flow rate signal (r) is compared with a reducing material flow rate limit signal (s) estimated from standards of a reducing material discharged from the plant. More specifically, there is calculated by a subtractor 73 a difference between a regulation value of a reducing material amount discharged from a plant, which is estimated from a plant amount (t) such as, for example, plant load and duration after starting defining a regulation amount and a regulation range by a discharged reducing material regulation calculator 69, and a measured reducing material amount (concentration or flow rate) in exhaust gas at the outlet of the nitrogen oxide removal apparatus by a reducing material sensor 71, and the difference is multiplied by the gain in the gain 75 to generate a first reducing material flow rate limit signal (s). A first low signal selector 77 compares the reducing material injection flow rate signal (r) with the reducing material flow rate limit signal (s), and selects and outputs a smaller signal.

As described above, the reducing material injection flow rate is limited such that a discharged reducing material does not exceed the regulation value, and hence the regulation of the discharged reducing material is satisfied.

A reducing material, which is usually injected after being diluted with air, might explode if it exists in air in predetermined concentration or more, which is unfavorable on plant operation. To solve this difficulty, an air dilution flow rate detector 79 detects an air dilution flow rate, and a reducing material flow rate limit calculator 81 estimates an upper limit of the reducing material flow rate where the plant can safely be operated, on the basis of a measured air dilution flow rate and outputs a second reducing material flow rate limit value signal (u) to a second low signal selector 83. The second low signal selector 83 compares the output of the first low signal selector 77 with the output of the second reducing material limit signal (u) and outputs the smaller signal as a reducing material flow rate setpoint signal (v).

As described above, a setpoint of the reducing material injection is limited such that the reducing material is not injected exceeding a value dangerous on plant operation, and hence the plant can safely be operated.

There is thus formed a reducing material flow rate setpoint signal (v) representing a setpoint of the secondary feedback control system. In the secondary feedback control system, a subtractor 85 evaluates a deviation of a measured reducing material flow rate signal (w) from a reducing material flow rate meter 87 and the reducing material flow rate setpoint signal (v), and a PI controller 89 inputs the deviation and outputs a valve operation signal (x) to a reducing material flow rate regulator 91 such that the measured reducing materal flow rate will be equal to the setpoint.

In the present embodiment, as described above, a NOx concentration setpoint is estimated by the primary feedback control system, with which value the plant is operable with most satisfactory nitrogen oxide removal performance which satisfies the standards of an instantaneous NOx value and an average NOx value, and which depends on the plant operating conditions. By controlling the plant with the NOx concentration setpoint, the standards can be satisfied and an optimum amount of a reducing material can be injected upon starting and stopping processes of the plant and upon load variations.

In the feedforward control system, the inlet NOx concentration signal as a preceding factor is corrected in respect of measurement delay of the NOx sensor 23, so that an influence of the delay to the control system can be eliminated. Further, the mole ratio, by which the inlet NOx flow rate is multiplied to generate the FF reducing material injection flow rate signal (g), is estimated on the basis of the plant operating condition, and the same mole ratio is changed according to a change in the NOx concentration setpoint used in the primary feedback control system, so that various standards can be satisfied and no interference between the primary feedback control system and the feedforward control system occurs in the starting and stopping processes and in the course of load variations for improvement of controllability.

Additionally, the reducing material injection flow rate is limited such that a discharged reducing material does not exceed the regulation value, so that the standards of the emitted reducing material can be satisfied. Furthermore, a reducing material is prevented from being injected more than a dangerous amount on the plant operation, so that the plant can safely be operated.

Figure 6:
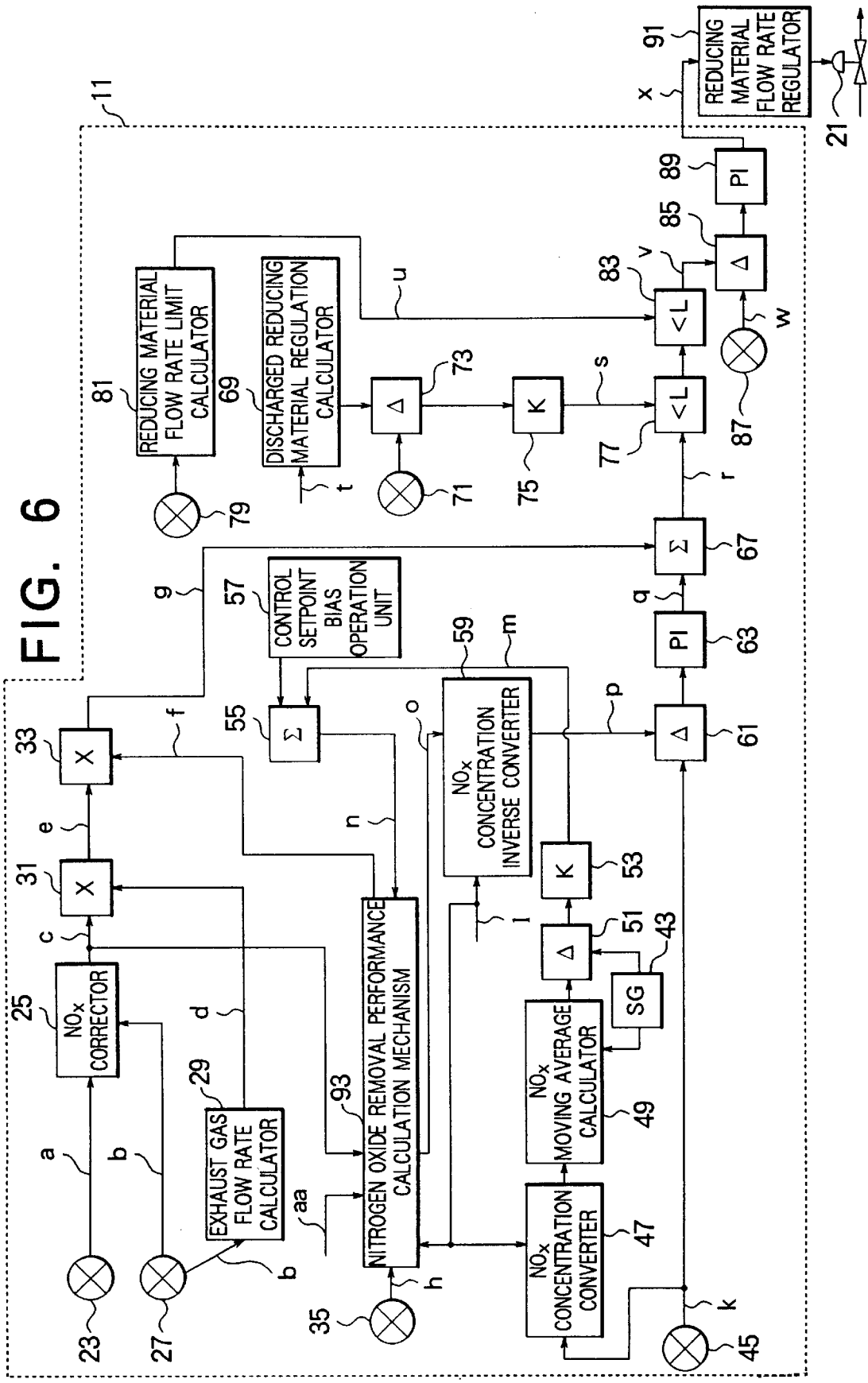
FIG. 6 is a block diagram illustrating another embodiment of the nitrogen oxide removal control apparatus of the present invention of FIG. 1.

Referring to FIG. 6, another embodiment of the nitrogen oxide removal control apparatus 11 is illustrated. In the present embodiment, a new nitrogen oxide removal performance calculation mechanism 93 is provided, which is constructed by uniting the control setpoint calculator 37 and the elementary mole ratio calculator 39 in the previous embodiment of FIG. 3, whereby an improvement of the accuracy and follow-up property for the state variations of the plant is contemplated. A nitrogen oxide removal performance calculation mechanism 93 inputs the calculation signal (h) from the calculation input detector 35, the inlet corrected NOx concentration signal (c) from the NOx corrector 25, the gas turbine exhaust $O_2$ concentration signal (l), the total amount-of-change signal (n) outputted from the adder 55, and a plant cumulative operation time signal (aa) in the plant, and outputs the NOx concentration setpoint signal (o) and the mole ratio signal (f)

Figure 7:
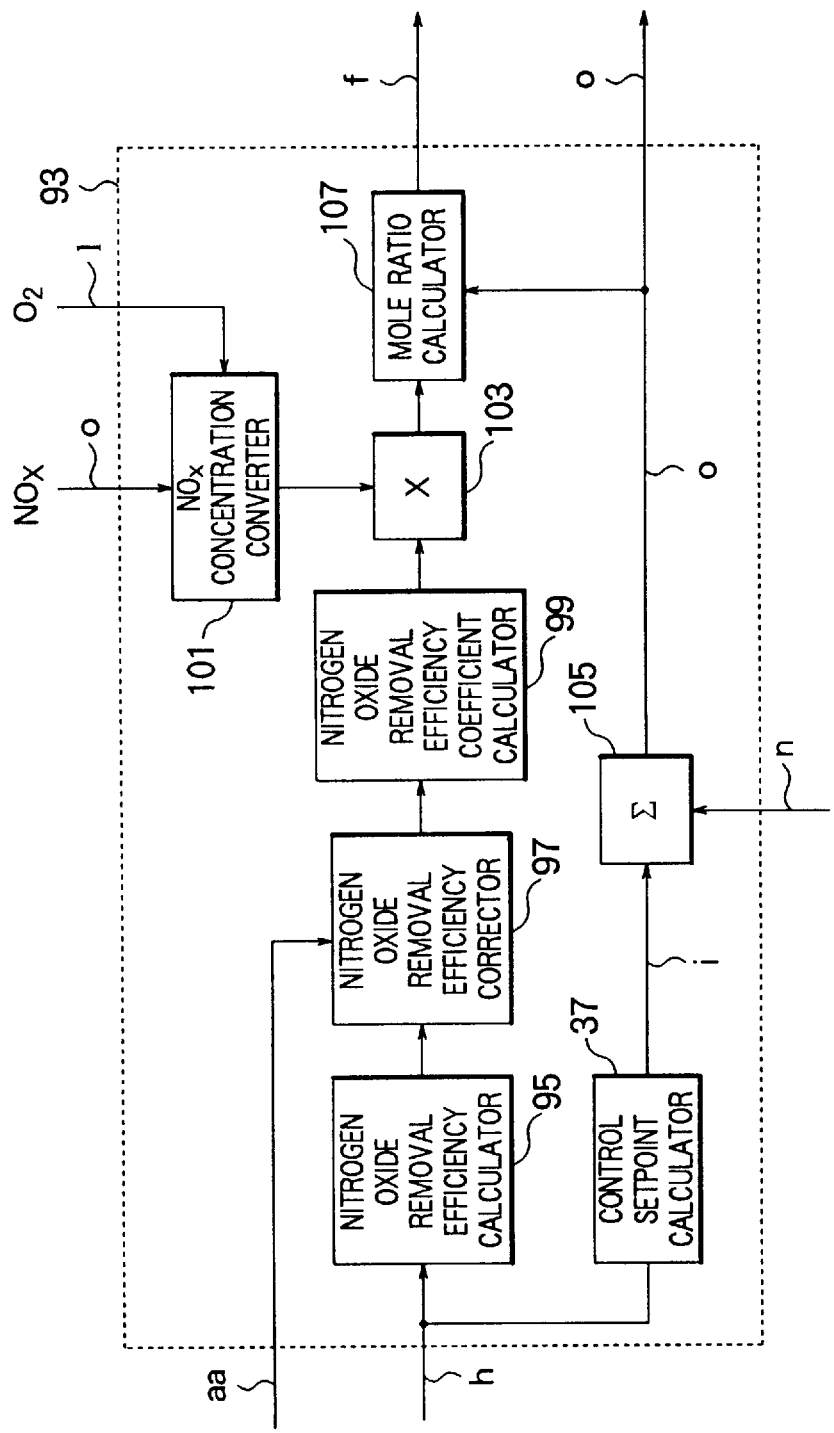
FIG. 7 is a block diagram illustrating a nitrogen oxide removal performance estimation mechanism of FIG. 6.

The nitrogen oxide removal performance calculation mechanism 93 comprises, as illustrated in FIG. 7, a nitrogen oxide removal efficiency calculator 95, a nitrogen oxide removal efficiency corrector 97, a nitrogen oxide removal efficiency coefficient calculator 99, a NOx concentration converter 101, a multiplier 103, a control setpoint calculator 37, an adder 105, and a mole ratio calculator 107.

The nitrogen oxide removal efficiency calculator 95 estimates a relationship between a nitrogen oxide removal efficiency and a mole ratio from the calculation signal (h). The estimation is achieved by taking proper several points (e.g., 0.7, 0.8, 0.9, 1.0, 1.1, 1.2, 1.3) as the mole ratio in the aforementioned equation (1) and using the calculation signal (h). Now, a catalyst in the nitrogen oxide removal apparatus is known to be lowered in its nitrogen oxide removal efficiency owing to its deterioration with the passage of time. Against this, the nitrogen oxide removal efficiency corrector 97 estimates a correction coefficient of the nitrogen oxide removal efficiency due to the deterioration with the passage of time based upon the plant cumulative operation time signal aa in the plant, and multiplies the nitrogen oxide removal efficiency calculated by the nitrogen oxide removal efficiency calculator 95 by the correction coefficient to estimate a relationship between a present nitrogen oxide removal efficiency for which the deterioration with the passage of time is taken into consideration and the mole ratio. The nitrogen oxide removal efficiency coefficient calculator 99 estimates a value yielded by subtracting the present nitrogen oxide removal efficiency from 1 as the nitrogen oxide removal efficiency coefficient whereby a relationship between the nitrogen oxide removal efficiency coefficient and the mole ratio is yielded. The NOx concentration converter 101 converts the inlet corrected NOx concentration signal (c) from the NOx corrector 25 based upon the exhaust $O_2$ concentration signal (l) in the same manner as in the NOx concentration converter 47. The multiplier 103 multiplies the converted inlet NOx concentration by the nitrogen oxide removal efficiency coefficient to estimate the outlet NOx concentration yielded from the present nitrogen oxide removal efficiency, whereby the relationship between the nitrogen oxide removal efficiency coefficient and the mole ratio in the nitrogen oxide removal efficiency coefficient calculator 99 is changed to the relationship between the outlet NOx concentration and the mole ratio.

The control setpoint calculator 37 estimates the control setpoint signal (i) based upon the calculation signal (h) as described previously. The adder 105 adds the total amount-of-change signal (n) to the control setpoint signal (i) to generate the NOx concentration setpoint signal (o).

The mole ratio calculator 107 estimates a mole ratio relative to the NOx concentration setpoint signal (o) based upon the relationship between the outlet NOx concentration and the mole ratio outputted from the multiplier 103 and upon the NOx concentration setpoint signal (o).

As described above, there can be estimated in a direct manner a relationship between the nitrogen oxide removal efficiency and the mole ratio in the present state where catalyst deterioration in the nitrogen oxide removal apparatus with the passage of time is taken into consideration. Further, the outlet NOx concentration is estimated on the basis of the nitrogen oxide removal efficiency and present inlet NOx concentration free of delayed measurement, and the relationship between the outlet NOx concentration and the mole ratio is estimated from a relationship between a nitrogen oxide removal efficiency and a mole ratio in the present plant operating conditions. From the estimated relationship there can be estimated an optimum mole ratio required for taking the outlet NOx concentartion as a present NOx concentration setpoint.

Figure 8:
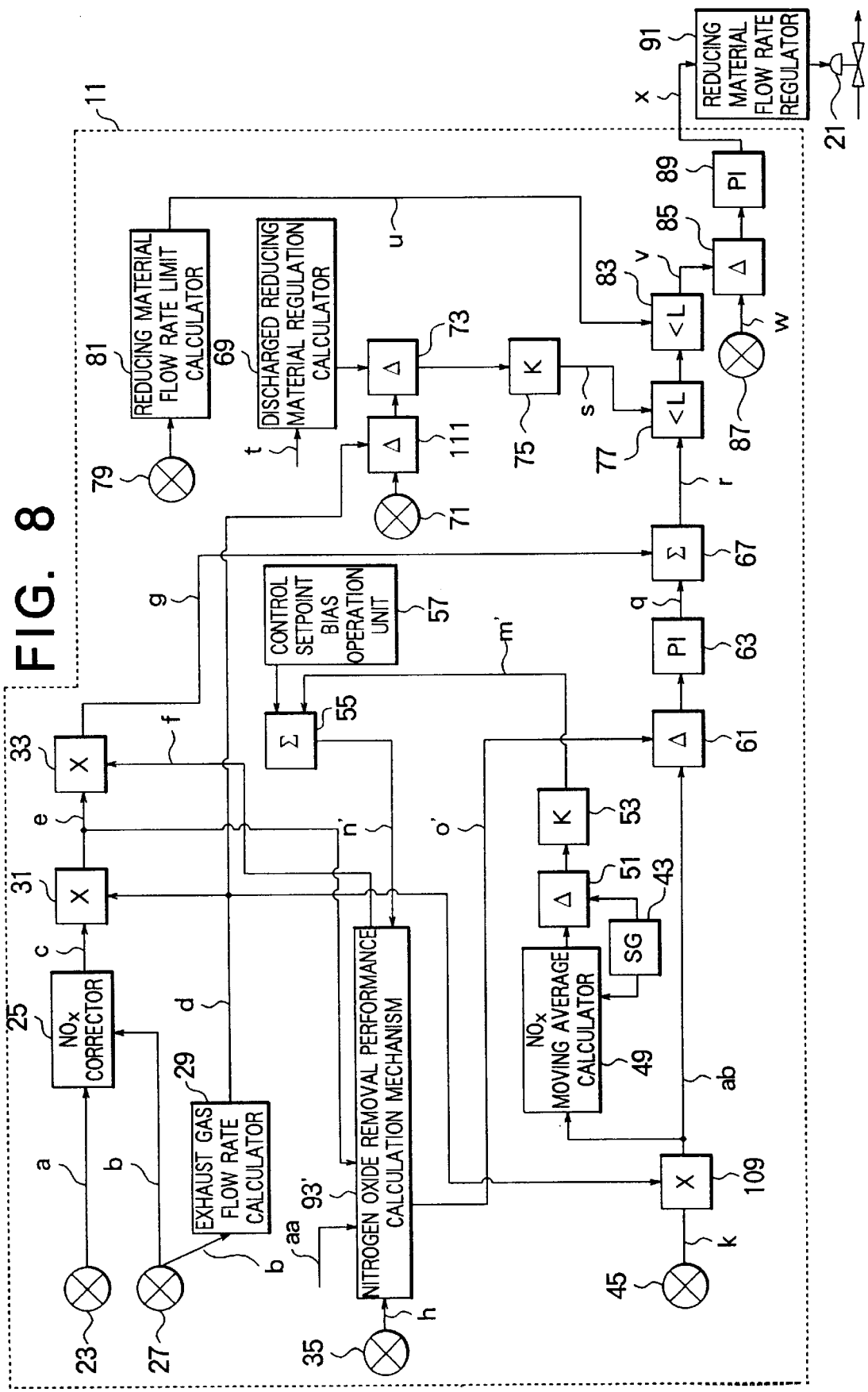
FIG. 8 is a block diagram illustrating a further embodiment of the nitrogen oxide removal control apparatus of the present invention of FIG. 1.

Referring to FIG. 8, a further embodiment will be described. Although in the foregoing embodiment the control is achieved on the basis of NOx concentration at the outlet of the nitrogen oxide removal apparatus, there is an occasion where the control is performed on the basis of outlet NOx flow rate at the outlet of the nitrogen oxide removal apparatus from the viewpoint of the standards.

FIG. 8 illustrates a modification of the nitrogen oxide removal control apparatus 11 illustrated in FIG. 6, which is applied to the case where flow rate regulation is performed. In the present embodiment, there is provided a multiplier 109 which is to multiply the outlet measured NOx concentration signal (k) from the NOx sensor 45 by the exhaust gas flow rate signal (d) from the exhaust gas flow rate calculator 29 to output an outlet measured NOx flow rate signal ab. The standard of the moving average per hour for a NOx flow rate at the outlet of the nitrogen oxide removal apparatus is previously set in the signal generator 43. The NOx moving average calculator 49 inputs the outlet measured NOx flow rate signal ab from the multiplier 109, and estimates a moving average per hour during a regulation period excepting a predetermined duration upon starting and stopping. The subtractor 51 evaluates a difference between a measured value from the moving average calculator 49 and the standard from the signal generator 43, and the gain 53 calculates an amount-of-change signal (m') for the control setpoint based upon the difference to output it to the adder 55.

In the control setpoint bias operation unit 57, when an increase or a decrease with respect to a present NOx flow rate setpoint signal (o') is set by an operator with a bias, the increase or the decrease, i.e., an amount of the change is outputted to the adder 55. The adder 55 estimates a total amount-of-change signal (n') and outputs it to a nitrogen oxide removal performance calculation mechanism 93'.

The nitrogen oxide removal performance calculation mechanism 93' inputs the plant cumulative operation time signal aa, the calculation signal (h), the inlet NOx flow rate signal (e), and the total amount-of-change signal (n'), and estimates the mole ratio signal (f) and the NOx flow rate setpoint signal (o') from the aforementioned signals.

Figure 9:
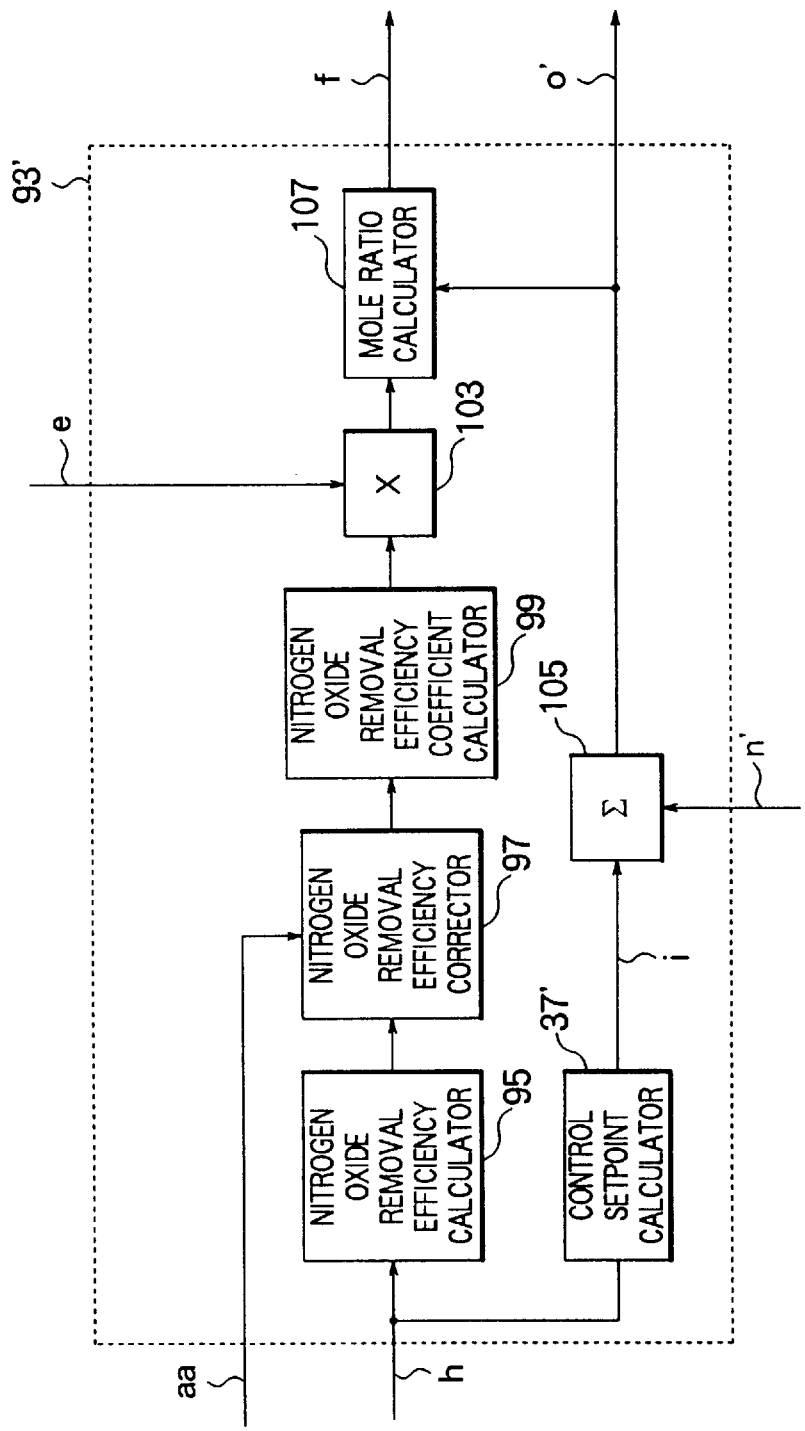
FIG. 9 is a block diagram illustrating a nitrogen oxide removal performance estimation mechanism of FIG. 8.

Referring to FIG. 9, in the nitrogen oxide removal performance calculation mechanism 93', the nitrogen oxide removal efficiency calculator 95 estimates a relationship between the nitrogen oxide removal efficiency and the mole ratio from the calculation signal (h), as described previously. The nitrogen oxide removal efficiency corrector 97 performs a correction for the nitrogen oxide removal efficiency, taking lowering of the nitrogen oxide removal efficiency due to deterioration thereof with the passage of time into consideration, based upon the plant cumulative operation time signal aa to estimate a relationship between the present nitrogen oxide removal efficiency and the mole ratio. In succession, the nitrogen oxide removal efficiency coefficient calculator 99 estimates a relationship between the nitrogen oxide removal efficiency coefficient yielded by subtracting the nitrogen oxide removal efficiency from 1 and the mole ratio. The multiplier 103 multiplies the inlet NOx flow rate signal (e) estimated on the basis of the inlet corrected NOx concentration signal (c) not including the measurement delay of the NOx sensor 23 by the nitrogen oxide removal efficiency coefficient to estimate a relationship between the outlet NOx flow rate and the mole ratio.

In contrast, a control setpoint calculator 37', a control setpoint of the outlet NOx flow rate from the calculation signal (h) in the same manner as in the control setpoint calculator 37. Then, the total amount-of-change (n') and the control setpoint of the outlet NOx flow rate are added to each other in the adder 105 to generate the NOx flow rate setpoint signal (o') which is in turn outputted to the mole ratio calculator 107. The mole ratio calculator 107 estimates a mole ratio relative to the NOx flow rate setpoint signal (o') based upon the relationship between the outlet NOx flow rate as the output of the multiplier 103 and the mole ratio, and outputs a mole ratio signal (f).

As understood from FIG. 8, in the primary feedback control system, the subtractor 61 calculates a deviation of the inlet NOx flow rate signal and the NOx flow rate setpoint signal (o'), and the PI controller 63 produces the FB reducing material injection flow rate signal (q).

When the regulation to an emitted reducing material is performed on a flow rate base (in this case, an output of the discharged reducing materal regulation calculator 69 is a flow rate signal.), there is provided a multiplier 111 for estimating the reducing material emission flow rate by multiplying an output signal from the reducing material sensor 71 by an exhaust gas flow rate signal (d), whereby the reducing material injection flow rate signal (r) is limited.

As described above, the control is likewise achieved even when the outlet NOx setpoint and the emitted reducing material regulation are not concentrations but flow rates.

Also the nitrogen oxide removal control apparatus 11 illustrated in FIG. 3, can be likewise modified when the NOx setpoint and the emitted reducing material regulation have units of flow rate. Additionally, even when the NOx setpoint is concentration and the emitted reducing material regulation is a flow rate or even in the reverse case thereof, further even when a combination of concentration/flow rate is changed over for the NOx setpoint or the emitted reducing material regulation depending on the state of the plant, they can easily be dealt with by combining the embodiment illustrated in FIG. 6 and the embodiment illustrated in FIG. 8.

Figure 10:
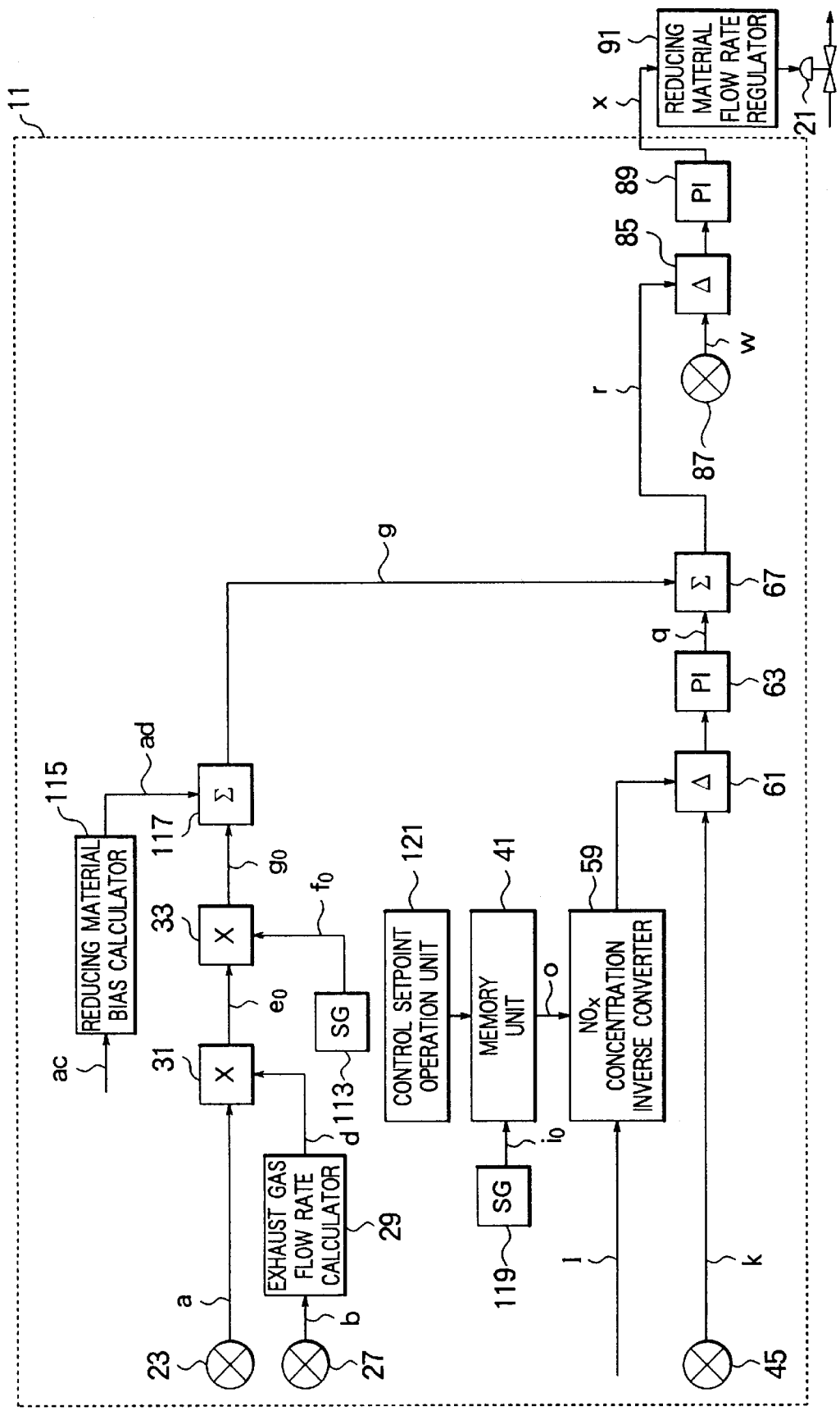
FIG. 10 is a block diagram illustrating a still another embodiment of the nitrogen oxide removal control apparatus of the present invention of FIG. 1.

Referring to FIG. 10, a further another embodiment will be described. There is an occasion in the prior art that excessive mixing or dilute mixing of a transiently injected reducing material is produced owing to a rapid change in produced NOx in a multistage combustor, followed by variations of the NOx amount at the outlet of the nitrogen oxide removal apparatus. In the present embodiment, it is contemplated that accuracy of the feedforward control for variations of the plant state is further improved and the follow-up property is improved.

The present embodiment also comprises fundamentally the primary feedback control system, the secondary feedback control system, and the feedforward control system. In the feedforward system, the measured inlet NOx concentration signal (a) from the sensor 23 is multiplied by the exhaust gas flow rate signal (d) to generate an inlet NOx flow rate signal $e_0$. The inlet NOx flow rate signal $e_0$ and a mole ratio (a signal $f_0$) set in a signal generator 113 are multiplied by each other to generate an elementary FF reducing material injection flow rate signal $g_0$. The measured inlet NOx concentration signal (a) from the sensor 23 fails owing to measurement delay to follow up to rapid change in NOx emission from the multistage combustor as described in FIG. 2. This causes excessive mixing or dilute mixing of the reducing material and results in variations of a NOx amount at the outlet of the nitrogen oxide removal apparatus. It is necessary to compensate the excessive mixing or dilute mixing of the reducing material in order to suppress the outlet NOx variations. Additionally, the nitrogen oxide removal process has a time delay, so that it is necessary to catch variations of produced NOx as soon as possible. For this, there are provided a reducing materal bias calculator 115 and an adder 117 as a new mechanism. The reducing materal bias calculator 115 receives at least one signal (ac) selected from a fuel flow rate, a demand of a load, and a present load concerning the production of NOx, and estimates a bias of the reducing material injection flow rate with respect to the variations of the input signal, and the adder 117 adds the bias calculated by the reducing material bias calculator 115 to the elementary FF reducing material injection flow rate signal $g_0$ to generate the FF reducing material injection flow rate signal (g).

In the primary feedback control system, the control setpoint signal ($i_0$) set in a signal generator 119 is outputted to the memory 41. The memory 41, when an operator operates a control setpoint operation unit 121 in order to increase or decrease a control setpoint of the memory 41, alters the control setpoint signal $i_0$ using an alteration signal from the control setpoint operation unit 121 and outputs a NOx concentration setpoint signal (o). The NOx concentration setpoint signal (o) is inverse-converted using the gas turbine exhaust $O_2$ concentration signal (l) and is compared with the outlet measured NOx concentration signal (k) from the NOx sensor 45, whereby the PI controller 63 estimates the FB reducing material injection flow rate signal (q) based upon a deviation of said signals.

In the adder 67, the FB reducing material injection flow rate signal (q) from the primary feedback control system and the FF reducing material injection flow rate signal (q) are added to generate the reducing material injection flow rate signal (r), whereby the secondary feedback control system performs the control using the reducing material flow rate signal (r) as the control setpoint.

With the arrangement described above, the present embodiment can follow up to even rapid variations of the NOx production in a multistage combustor for improvement of the controllability.

Figure 11:
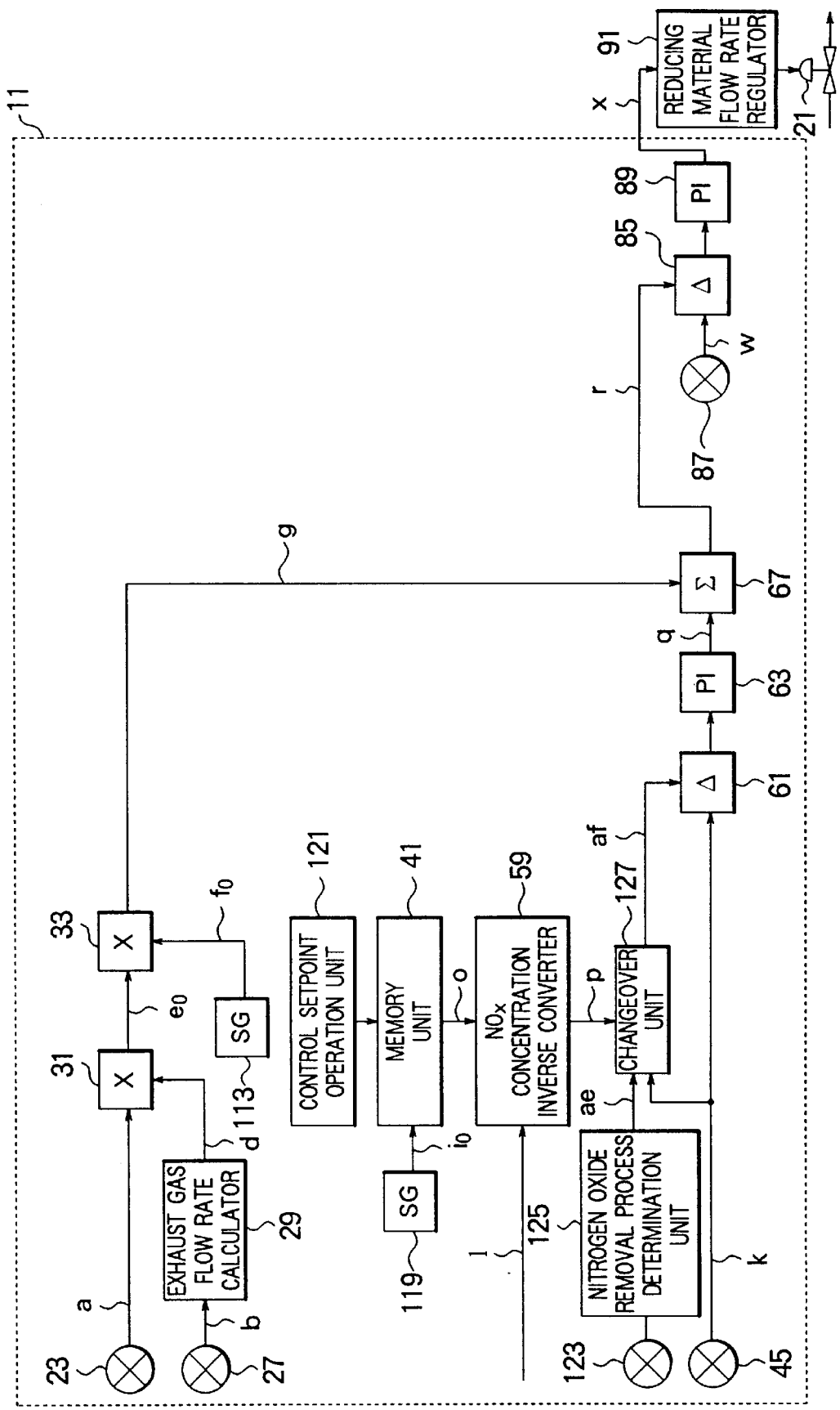
FIG. 11 is a block diagram illustrating a still further embodiment of the nitrogen oxide removal control apparatus of the present invention of FIG. 1.

Referring to FIG. 11, a still further another embodiment will be described. The present embodiment is contemplated improving the controllability at the time when the plant is started under the low temperature of a catalyst in the nitrogen oxide removal apparatus, for example, upon cold starting.

The present embodiment also comprises fundamentally the primary feedback control system, the secondary feedback control system, and the feedforward control system. There are provided as a new mechanism a nitrogen oxide removal state detector 123 for detecting at least one signal selected from nitrogen oxide removal catalyst temperature, nitrogen oxide removal catalyst inlet gas temperature, and a load, a nitrogen oxide removal process determination unit 125, and a changeover unit 127 in the primary feedback control system.

In the prior art, when temperature of the catalyst in the nitrogen oxide removal apparatus is low, for example, upon cold starting, a nitrogen oxide removal reaction is difficult to proceed and hence the response of the primary feedback control system is largely lowered, compared with the case at high temperature. Further, at low temperature the operation with lower efficiency is forced than the nitrogen oxide removal efficiency at high temperature. This lowers a process gain in view of the nitrogen oxide removal control apparatus. Adjustment of the control is generally done in a load zone where the plant is operated, i.e., in the state where catalyst temperature is high and hence nitrogen oxide removal efficiency is satisfactory or in the state with a high process gain, so that controllability is deteriorated in the state with a low process gain at low temperature. The FB reducing material injection flow rate signal (g) from the primary feedback control system with the deteriorated controllability owing to a delayed response interferes with the FF reducing material injection flow rate signal (g) from the feedforward control system to result in excessive mixing or dilute mixing of a reducing material, whereby the NOx amount at the outlet of the nitrogen oxide removal apparatus is varied.

To prevent such interference, the present embodiment is adapted such that a nitrogen oxide removal state detector 123 detects at least one signal selected from nitrogen oxide removal catalyst temperature, nitrogen oxide removal catalyst inlet gas temperature and a load, and a nitrogen oxide removal process determination unit 125 determines the nitrogen oxide removal process state, i.e., judges whether or not the primary feedback control system interferes with the feedforward control system when the former is incorporated in the apparatus, based upon the signal from the nitrogen oxide removal state detector 123 to output a nitrogen oxide removal process determination signal (ae) to the changeover unit 127. The changeover unit 127 selects the NOx concentration setpoint value signal (p) from the NOx concentration inverse converter 59 as a final control setpoint signal (af) when the nitrogen oxide removal process determination signal (ae) indicates that no interference is existent, and outputs it to the subtractor 61. In contrast, it selects the outlet NOx concentration signal (k) from the NOx sensor 45 as the final control setpoint signal (af) when any interference is existent, and outputs it to the subtractor 61.

In the subtractor 61, although a difference between the final control setpoint signal (af) and the outlet NOx concentration signal (k) is estimated, the difference is zero provided the outlet NOx concentration signal (k) is selected by the changeover unit 127, and hence the FB reducing material injection flow rate signal (q) which is the output of the PI controller 63 is zero. Hereby, the primary feedback control system is separated from the control. Further, provided the NOx concentration setpoint signal (p) is selected, the FB reducing material injection flow rate signal (q) is yielded by the PI controller 63 and hence the primary feedback control system is incorporated in the control.

Thus, the adder 67 adds the FB reducing material injection flow rate signal (q) which is the output of the primary feedback control system and the FF reducing material injection flow rate signal (g) which is the output of the feedforward control system to each other. The secondary feedback control system performs the control according to the output of the adder 67.

With the aforementioned arrangement, the controllability is improved even when the catalyst temperature is low as in cold starting.

Referring to FIG. 12, a still further another embodiment will be described. The present embodiment contemplates improving the controllability upon the starting/stopping process and upon load variations, and further improves the controllability when the plant is started at the low temperature of the catalyst in the nitrogen oxide removal apparatus such as in cold starting.

The embodiment also comprises fundamentally the primary feedback control system, the secondary feedback control system, and the feedforward control system. The embodiment additionally incorporates the feedforward control system and the primary feedback control system illustrated in FIG. 3 in the embodiment illustrated in FIG. 11 in order to improve the controllability upon the starting/stopping process and upon the load variations. When the primary feedback control system and the feedforward control system interfere with each other, a changeover unit 129 separates the primary feedback control system from the control based upon the nitrogen oxide removal process determination signal (ae) from the nitrogen oxide removal process determination unit 125.

In contrast, the feedforward control system employs the mole ratio signal (f) containing factors of the amount of a change in the control setpoint and regulations for NOx moving average per hour. Accordingly, the feedforward control system contains elements of the primary feedback. So, when the primary feedback control system and the feedforward control system interfere with each other, there is need of the use of the elementary mole ratio signal (j) from the elementary mole ratio calculator 39 instead of the mole ratio signal (f). The changeover unit 129 therefore selects the mole ratio signal (f) from the mole ratio corrector 65 based upon the nitrogen oxide removal process determination signal (ae) from the nitrogen oxide removal process determination unit 125 when the signal (ae) indicates that the primary feedback control system does not interfere with the feedforward control system, while it selects the elementary mole ratio signal (j) from the elementary mole ratio calculator 39 when both interfere with each other, and outputs the selected signal, as a final mole ratio signal (ag).

The multiplier 33 multiplies the final mole ratio signal (ag) and the inlet NOx flow rate signal (e) by each other, and outputs the FF reducing material injection flow rate signal (g) which is the output of the feedforward control system.

Thus, in the adder 67, there are added the FB reducing material flow rate signal (q) which is the output of the primary feedback control system and the FF reducing material flow rate signal (g) which is the out put of the feedforward control system to each other. The secondary feedback control system performs the control according to the output from the adder 67.

With the arrangement described above, there are contemplated an improvement of the controllability upon the starting/stopping process and upon the load variations, and an improvement of the controllability when the plant is started at the low temperature of the catalyst in the nitrogen oxide removal apparatus as in cold starting.

While the present invention has been described with reference to the preferred embodiments illustrated in the figures, the present invention is not limited thereto, but includes those altered and modified within the scope of the present invention as defined by the appended claims.

What is claimed is:

1. A nitrogen oxide removal control apparatus for controlling injection of a reducing material into an exhaust gas flow from a gas turbine unit, in a nitrogen oxide removal means, the apparatus comprising:

means for measuring a NOx amount at an outlet of the nitrogen oxide removal means to generate an outlet measured NOx signal;

means for calculating an injection flow rate of the reducing material based on a deviation of the outlet measured NOx signal and a NOx setpoint to approximate the deviation to zero and for generating a feedback control reducing material injection flow rate signal;

means for measuring a NOx amount at an inlet of the nitrogen oxide removal means to generate an inlet measured NOx signal;

means for calculating an amount of the reducing material effective to react with the NOx amount at the inlet of the nitrogen oxide removal means based on the inlet measured NOx signal and a predetermined mole ratio of a reducing material to NOx to generate an feedforward control reducing material injection flow rate signal;

means for calculating a reducing material injection flow rate into the exhaust gas flow based on the feedback control reducing material injection flow rate signal and the feedforward control reducing material injection flow rate signal; and means for determining a state of a nitrogen oxide removal process based on a state amount of the nitrogen oxide removal means and for cutting off the feedback control reducing material injection flow rate signal into said means for calculating the reducing material injection flow rate when the state of the nitrogen oxide removal process is lower than a certain level.

2. The apparatus according to claim 1, wherein the state amount of the nitrogen oxide removal means includes at least one selected from nitrogen oxide removal catalyst temperature, nitrogen oxide removal catalyst inlet gas temperature, and a plant load.

3. A nitrogen oxide removal control apparatus for controlling injection of a reducing material into an exhaust gas flow from a gas turbine unit, in a nitrogen oxide removal means, the gas turbine unit including a combustor and a turbine, the nitrogen oxide removal control apparatus comprising:

means for measuring a NOx amount at an outlet of the nitrogen oxide removal means to generate an outlet measured NOx signal;

means for calculating an injection flow rate of the reducing material based on a deviation of the outlet measured NOx signal and a NOx setpoint to approximate the deviation to zero and for generating a feedback control reducing material injection flow rate signal;

means for measuring a NOx amount at an inlet of the nitrogen oxide removal means to generate an inlet measured NOx signal;

means for correcting the measured NOx amount at the inlet of the nitrogen oxide removal means based on combustion conditions of the gas turbine unit to generate an inlet corrected NOx signal;

means for calculating the NOx setpoint and a mole ratio of the reducing material to NOx based on the operating conditions of a plant having the gas turbine unit, the operating conditions of the plant being related to a state of the gas turbine exhaust;

means for calculating an amount of the reducing material effective to react with the NOx amount at the inlet of the nitrogen oxide removal means based on the inlet corrected NOx signal and the mole ratio to generate a feedforward control reducing material injection flow rate signal;

means for calculating a reducing material injection flow rate into the exhaust gas flow based on the feedback control reducing material injection flow rate signal and the feedforward control reducing material injection flow rate signal; and means for determining a state of a nitrogen oxide removal process based on a state amount of the nitrogen oxide removal means and for cutting off the feedback control reducing material injection flow rate signal into said means for calculating the reducing material injection flow rate when the state of the nitrogen oxide removal process is lower than a certain level.

4. The apparatus according to claim 3, wherein the state amount of the nitrogen oxide removal means includes at least one selected from nitrogen oxide removal catalyst temperature, nitrogen oxide removal catalyst inlet gas temperature, and a plant load.

5. A nitrogen oxide removal control apparatus for controlling injection of a reducing material into an exhaust gas flow from a gas turbine unit, in a nitrogen oxide removal means, the gas turbine unit including a combustor and a turbine, the nitrogen oxide removal control apparatus comprising:

means for measuring a NOx amount at an outlet of the nitrogen oxide removal means to generate an outlet measured NOx signal;

means for calculating an injection flow rate of the reducing material based on a deviation of the outlet measured NOx signal and a NOx setpoint to approximate the deviation to zero and for generating a feedback control reducing material injection flow rate signal;

means for measuring a NOx amount at an inlet of the nitrogen oxide removal means to generate an inlet measured NOx signal;

means for correcting the measured NOx amount at the inlet of the nitrogen oxide removal means based on combustion conditions of the gas turbine unit to generate an inlet corrected NOx signal;

means for calculating the NOx setpoint and a mole ratio of the reducing material to NOx based on the operating conditions of a plant having the gas turbine unit, the operating conditions of the plant being related to a state of the gas turbine exhaust;

means for calculating an amount of the reducing material effective to react with the NOx amount at the inlet of the nitrogen oxide removal means based on the inlet corrected NOx signal and the mole ratio to generate a feedforward control reducing material injection flow rate signal;

means for calculating a reducing material injection flow rate into the exhaust gas flow based on the feedback control reducing material injection flow rate signal and the feedforward control reducing material injection flow rate signal;

means for calculating a moving average of the measured NOx amount at the outlet of the nitrogen oxide removal means based on the outlet measured NOx signal;

means for regulating the calculated NOx setpoint based on a difference between the moving average of the measured NOx and a predetermined value;

means for correcting the mole ratio based on a regulated amount of the NOx setpoint;

means for determining a state of a nitrogen oxide removal process based on a state amount of the nitrogen oxide removal means to output a determination signal;

means for cutting off the feedback control reducing material injection flow rate signal into said means for calculating the reducing material injection flow rate when the state of the nitrogen oxide removal process is lower than a certain level, based on the determination signal; and means for turning off said means for correcting the mole ratio when the state of the nitrogen oxide removal process is lower than a certain level, based upon the determination signal.

6. The apparatus according to claim 5, wherein the state amount of the nitrogen oxide removal means includes at least one selected from nitrogen oxide removal catalyst temperature, nitrogen oxide removal catalyst inlet gas temperature, and a plant load.

* * * * *